Jan. 9, 1940.   H. M. VICKERY   2,186,397
GRINDING MACHINE
Filed April 7, 1939
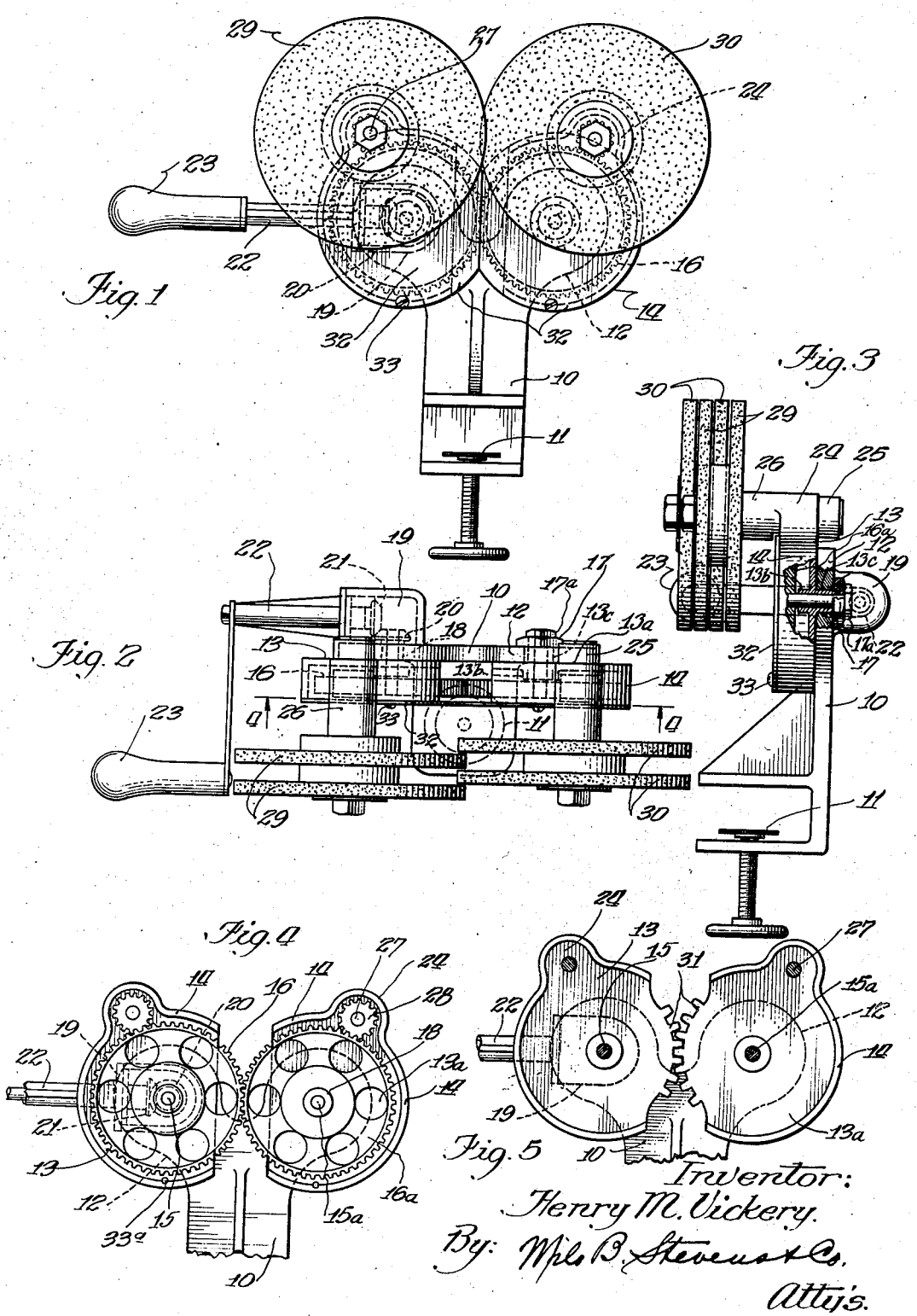

Patented Jan. 9, 1940

2,186,397

UNITED STATES PATENT OFFICE 2,186,397

GRINDING MACHINE

Henry M. Vickery, St. Andrews, Fla.

Application April 7, 1939, Serial No. 266,690

1 Claim. (Cl. 51—80)

My invention relates to manually-operated grinding machines, and more particularly to the twin type, where the grinding wheels are alternately arranged in two oppositely revolving sets, and my main object is to provide means for disposing the grinding wheel sets adjustably in relation to each other.

A further object of the invention is to provide bearings for the shafts of the grinding wheel sets, such bearings forming part of the housings for the drive gears and being centered on the shafts of the same.

Another object of the invention is to render the drive gear housings adjustable by rotation on the gear shafts, this action moving the grinding wheels toward or away from each other to increase or lessen their degree of overlap.

A still further object of the invention is to provide an adjustment of the grinding wheel sets which is balanced in relation to the drive gearing of the grinder and does not at any time impose strains or unequal stresses on the same.

An additional object of the invention is to construct the novel grinder along lines of ruggedness and simplicity.

With the above objects in view, and any others which may suggest themselves from the description to follow, a better understanding of the invention may be had by reference to the accompanying drawing, in which—

Fig. 1 is a front elevation of the grinder;

Fig. 2 is a top plan view;

Fig. 3 is an end view from the right-hand side of Fig. 1;

Fig. 4 is a section on the line 4—4 of Fig. 2; and

Fig. 5 is a view similar to Fig. 4, minus the internal parts, and showing a modification.

Referring specifically to the drawing, 10 denotes the upright frame of the grinder, the same being formed at the bottom with a table clamp 11, as is the practice in appliances of this type.

For the purposes of the present invention, the frame 10 is developed upwardly with lateral branches 12 of substantially circular type, these being adapted to receive gear housings 13 and 13a on the frontal side. As shown more clearly in Fig. 4, each of these housings is cup-flanged on the outer side and top as indicated at 14, but cut away or open on the inner or facing side. The center of the housing 13 receives a spindle 15 which carries a spur gear 16 in the hollow of the housing; and the housing 13a receives a spindle 15a which carries a spur gear 16a in the hollow of the housing, the gears of the two housing meeting as indicated in Fig. 4 to mesh.

The frame branch 12 is developed on the back side with a small housing 19 into which the spindle 15 projects to receive a bevel gear 20. An adjacent bevel gear 21 meshes with the gear 20 and has a shaft extending through a continuation 22 of the housing 19 to receive a crank handle 23, so that the operation of the latter induces the rotation of the gears 16 and 16a in opposite directions.

The housing 13a is extended with a forward hub 13b terminating close to the gear 16a, and also with a rearward hub 13c which passes with a snug fit through the corresponding frame branch 12, and extends from the same in threaded form, as indicated in Fig. 3, to receive a nut 17. The gear spindle 15a is journaled in the hubs 13b and 13c, and is formed as a screw beyond the latter, to receive a nut 17a. Thus, the nut 17 rigidly secures the housing 13a to the frame, while the nut 17a holds the spindle and gear to the housing. The gear housing 13 has hub formations similar to the housing 13a, the rear hub 18 thereof passing snugly through the frame branch 12, but extending only as far as the pinion 28.

Each gear housing is developed at the top with an offset pocket 24 which is extended rearwardly and forwardly with bearing portions 25 and 26, respectively, for a shaft 27. Within the pockets 24, the shafts 27 carry pinions 28 in mesh with the gears 16 and 16a. Beyond the front ends of the bearing portions 26 the shafts 27 receive the sets 20 and 30 of grinding wheels, these being staggered as previously mentioned and slightly overlapped for facility in grinding knives, shears, etc.

While it is not fundamentally novel to arrange and operate sets of overlapping grinding wheels by means of meshing gears receiving their motion from a crank handle, it is significant that the separate housings 13 and 13a are provided in the present embodiment to situate the grinding wheel shafts independently of each other. This is done to enable the wheel sets to be adjusted toward each other as they wear from use, or to separate them in case larger wheels are desirable. Yet, the novel embodiment does not merely provide separable grinding wheel supports, but centers them for rotary adjustment on the gear axes, which allows the pinions 28 to remain properly meshed with the corresponding gears at all times. Rotary adjustment supplies an ample degree of latitude for changing the distance between the wheel shafts 27, so that this is accomplished without impairing or weakening the drive connections to the shafts.

The adjustment of the grinding wheel sets is usually inward as the wheels wear, and this is made easily possible by slightly loosening the nut 17 and rotating the housing 13a on the center shaft 15 to a slight extent in a counter-clockwise direction. Or, the housings 13 may be geared to each other on their inner sides as indicated at 31 in Fig. 5, so that both grinding wheel sets will move together when adjusted and always remain equidistant from the vertical center line of the grinder. This expedient also forms a balancing connection for the grinding wheel sets, so that the possible loosening of one gear housing will not throw the corresponding grinding wheel set out of position.

As a matter of appearance, the front of the gear housings receives a pair of cover plates 32, secured by screws 33 in cavities 33a made in the respective housings. These cover plates are of thin sheet metal, to readily overlap in case the housings are gathered by adjustment from their most separated positions.

It will be evident from the above description that I have provided a grinder which is balanced throughout by the equalized mounting of its grinding wheel sets and the constant connection thereof to the drive gears, irrespective of the distance between the grinding wheel sets. Moreover, the fact that the adjustment of the grinding wheel sets is rotary enables a compact design to be made for the gear housings and pinion pockets, so that the grinder requires a small space and a minimum of material for its mechanism. Finally, the advanced features of the grinder do not complicate it in any manner, making its appearance and operation as simple as that of any comparable grinder, its construction rugged and its cost economical.

While I have illustrated the novel grinder along specific lines, various minor changes and refinements may be made therein without departing from its principle, and I desire to consider all such changes and refinements as coming within the scope and spirit of the appended claim.

I claim:

A grinding machine comprising a support, a pair of laterally-arranged housings centered in the support for rotary adjustment, a pair of laterally-grouped gears meshed and mounted for rotation in the respective housings, outer shafts journaled in the latter, pinions carried by the shafts at one of their ends in mesh with the related gears, and grinding wheel units carried by the other of said shafts ends, and gear formations on the contiguous sides of the housings and meshed to connect the latter for joint rotation in opposite directions.

HENRY M. VICKERY.